United States Patent [19]
Freshcorn

[11] 4,170,554
[45] Oct. 9, 1979

[54] WASTEWATER TREATMENT METHOD

[75] Inventor: Ivan G. Freshcorn, Kenton, Ohio

[73] Assignee: United Aircraft Products, Inc., Dayton, Ohio

[21] Appl. No.: 592,512

[22] Filed: Jul. 2, 1975

Related U.S. Application Data

[63] Continuation of Ser. No. 427,992, Dec. 26, 1973, abandoned.

[51] Int. Cl.² .............................................. C02C 5/02
[52] U.S. Cl. .............................. 210/50; 210/DIG. 30
[58] Field of Search ...................... 210/42, 46, 50, 51, 210/DIG. 30

[56] References Cited

U.S. PATENT DOCUMENTS

| | | | |
|---|---|---|---|
| 2,603,597 | 7/1952 | Dailey | 210/46 |
| 3,284,350 | 11/1966 | Williamson | 210/46 |
| 3,575,853 | 4/1971 | Gaughan et al. | 210/50 |
| 3,716,485 | 2/1973 | Robertson | 210/50 |
| 3,755,156 | 8/1973 | Yakovlev et al. | 210/50 |
| 3,800,024 | 3/1974 | Forsell et al. | 210/42 |

*Primary Examiner*—Thomas G. Wyse
*Attorney, Agent, or Firm*—J. E. Beringer

[57] ABSTRACT

A method of pollution abatement in the outflow of wastewater from a manufacturing plant or the like. A simultaneous precipitation of chromium and flouride contaminants is carried out with a subsequent removal of precipitates under conditions substantially reducing the volume of solids containing water to be handled.

2 Claims, 1 Drawing Figure

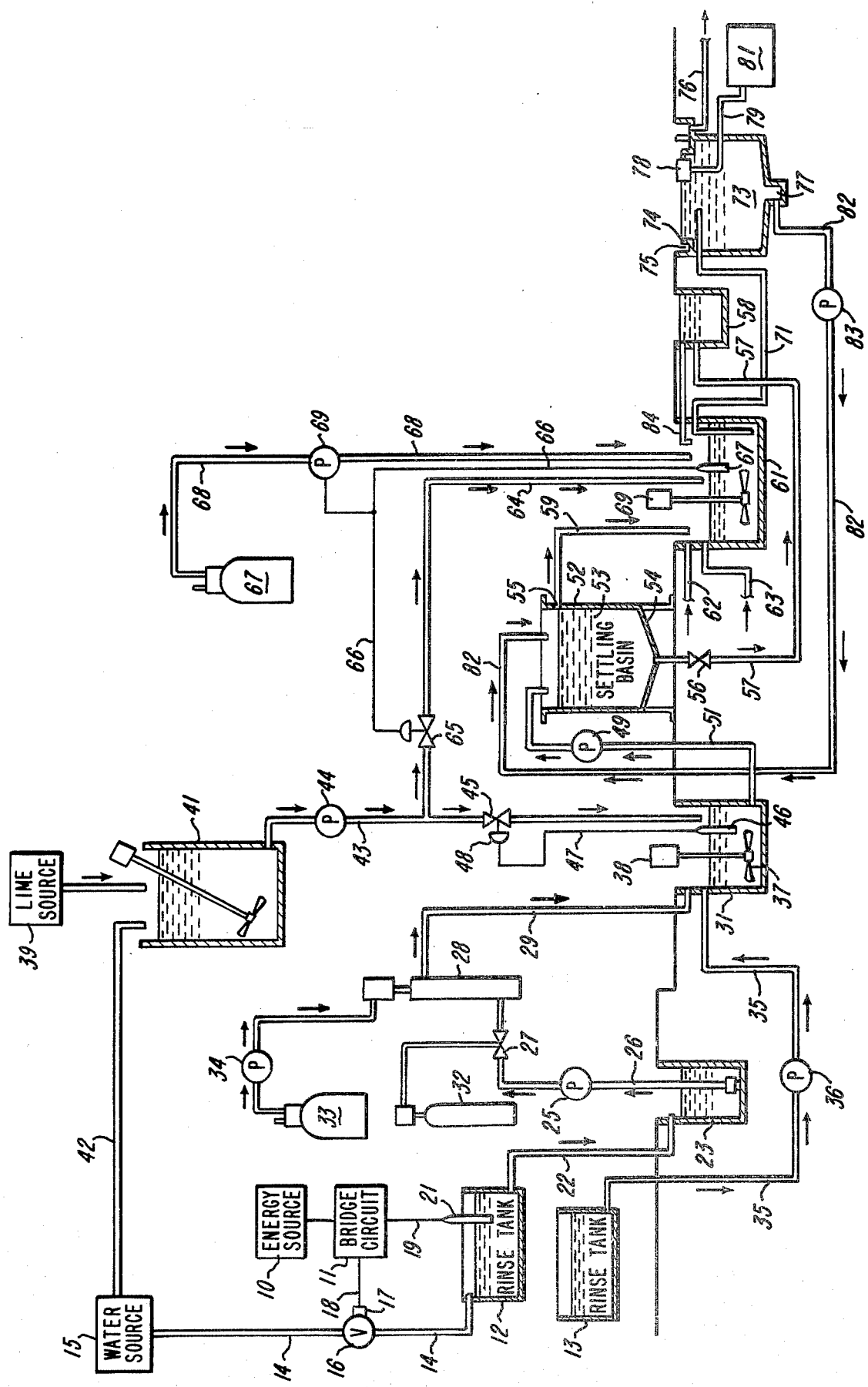

WASTEWATER TREATMENT METHOD

This is a continuation of application Ser. No. 427,992, filed Dec. 26, 1973, now abandoned.

BACKGROUND OF THE INVENTION

Wastewaters of a manufacturing plant or the like, as discharged to an adjacent stream, may contain excessive contaminants. In an instance to which the present invention has particular application, a manufacturing plant provides rinse tanks the contents of some of which in use become contaminated with chromium and the contents of others of which become contaminated with fluorides. Contamination can rise to levels regarded as deteriorating to the environment so that used rinse water cannot simply be pumped out of the building, but must be pretreated. The use of chemical reagents to achieve a neutralizing effect is known but both an under application and an over application thereof may have undesirable results. Moreover, generalized efforts in this regard may not provide for a separation of precipitated solids. Still further, neutralizing systems as known heretofore have contemplated separate treatment of fluoride containing wastewater and of chromium containing wastewater. The former, in a typical system of the prior art, is raised to a relatively high PH level of alkalinity and allowed to stand for an extended period. The concept of continuous treatment and of treatment in the same system and at the same time as chromium contaminated wastewater has been unknown.

SUMMARY OF THE INVENTION

This invention provides a generally new system of wastewater treatment specifically improved in at least three areas. These include the carrying out of a continuous sensing of water quality in rinse tanks, with fresh water added as required to avoid contamination extremes which may make subsequent treatment difficult. In a second area of improvement, chromium and fluoride bearing wastewater is mixed in a common chamber to which is added a precipitant for simultaneous precipitation of the chromium as Chromium Hydroxide and of the fluorides as Calcium Fluoride. The PH in such chamber is carefully controlled to remain above an acidity level and below a level at which trivalent chromium will revert to hexavalent chromium. In a third area of improvement, treated wastewater is directed to a clarifier by way of a settling basin for a separating out of precipitated solids. According to a feature of this area of improvement, finally settled solids from the clarifier are returned to the settling basin for efficient separation with minimal water handling.

The system has a universal aspect in that wastewater from other plant sources may also be directed to the clarifier, joining the metallic and salts bearing rinse water through at least a part of its treatment process. The total quantity of non-sanitary effluents accordingly may be mingled and discharged in a common flow, the quality level of which flow is controlled to conform to whatever standards may be imposed by regulatory agencies, and irrespective of the volume of flow in the stream to which the effluent discharges.

It is an object of the invention to provide a wastewater treatment method characterized particularly as in the foregoing.

Other objects and structural details of the invention will appear more clearly from the following description, when read in conjunction with the accompanying drawing, which is a diagram of a system embodying the method of the present invention.

In the diagram a source 10 of electrical energy is indicated as supplying power to a bridge circuit 11 having a control function which will hereinafter be referred to more directly. The system as diagrammatically illustrated includes other electrically powered apparatus including principally motors powering hydraulic pumps, mixers and the like. These motors likewise are powered from the source 10. For convenience and simplicity of illustration, electric conductors, and switches which may be embodied therein, which extend from the source 10 to the various motors have been omitted.

Rinse water tanks 12 and 13 are representative of tanks or tank systems involved in the treating of manufactured products. The treatment introduces into the contained bodies of water in the tanks chromium, in the case of tank 12, and a fluoride in the case of tank 13, regarded as contaminants in view of their toxic or nonassimilative, or both, nature. Either one or both of the tanks 12 and 13 are connected in water supply systems to have the contained water bodies therein replenished as required. In the case of chromium bearing tank 12, the water supply system includes a conduit 14 leading to the tank from a water source 15. In the conductor 14 is a valve 16 opened and closed under the control of electrically energizable means 17. The latter is included in a circuit which in part comprises electrical source 10 and bridge circuit 11, a lead line 18 extending from bridge circuit 11 to the means 17. Also in the described circuit, and connected to bridge circuit 11 by a lead 19 is a probe 21 immersed in the liquid body in tank 12. In a manner the details of which are unnecessary here to consider, the degree of contamination in tank 12 is sensed by probe 21, and, as the degree of contamination rises above a predetermined value valve 16 is opened to admit additional water to the tank 12. The result of this is further to dilute the contained body of liquid so that the proportion of contaminants to water does not rise to such levels as would make subsequent removal of the contaminants more difficult. In a control system suitable to the purpose, probe 21 incorporates electric potential means wherein the relatively high resistance of rinse water normally prevents the closing of an electrical gap at the probe. When the resistance of the rinse water is lowered by chromium contamination to a predetermined value, an electrical circuit is completed at probe 21 the result of which is to affect bridge circuit 11 in such a manner as to energize means 17 and open valve 16. The entrance of clean water reduces the proportion of contaminants, and, at a predetermined low level, the electrical resistance as sensed by probe 21 rises to a value to interrupt the circuit energizing means 17. As will be evident, controlling the level of contamination in tank 12 has an effect in reducing the amount of treatment chemicals required in subsequent processing and in reducing clean water requirements.

The contaminated rinse water in tanks 12 and 13 is regarded as wastewater and along with wastewater from other sources is pumped to waste, as for example to an adjacent stream. Treatment of the wastewater, and particularly that outflowing from tanks 12 and 13 is required in order that the effluent as it reaches the stream will have a quality regarded as acceptable to environmental control regulating agencies. In this connection, chromium carried in the wastewater issuing from tank 12 is a hexavalent chromium, highly toxic and not readily precipitated as a solid. Accordingly, in an initial treatment step, the wastewater emerging from tank 12 is conducted by a line 22 to a holding tank 23. There, a submerged foot valve 24 and a sump pump 25 cooperate in withdrawing chromium bearing wastewater by way of a line 26. The latter leads through an ejector 27 and a treatment chamber 28 to an extension 29 leading to a mixing chamber 31. The ejector 27 is connected to introduce sulfur dioxide from a cylinder 32. Treatment chamber 28 has sulfuric acid introduced therein from a vat 33 under the control of a pump 34. The arrangement, as will be understood, is one to convert the chromium in the flowing wastewater from hexavalent to trivalent. The acidity or PH level is established, for example, at a value of about 2.0 or 2.5. Wastewater from rinse tank 12 accordingly is pumped to the mixing chamber 31, and, in the process, contaminants therein are converted to a trivalent Chromium form. At the same time, and in a parallel connection, the wastewater from fluoride containing tank 13 is also conducted to mixing chamber 31, a line 35 incorporating a pump 36 being provided for this purpose. Fluorides from tank 13 and chromium from tank 12 accordingly are pumped simultaneously into a common chamber 31. There they are subjected to a blending or co-mingling operation under the influence of a mixer 37 driven by an electrically powered motor 38. Also having a controlled admission to chamber 31 is an alkaline precipitant drawn from a source 39. A lime mix tank 41 receives lime from source 39 and clean water from source 15, the latter being delivered by a line 42. A line 43 conducts the lime slurry from tank 41 to mixing chamber 31. In the line 43 is a pump 44 and a control valve 45. The latter is under control of means including a probe 46 immersed in the contained body of mixed wastewaters and lime slurry in chamber 31. The described control means is a commercially available means carrying out a continuous sensing of the acidity-alkaline or PH value of the mixture in chamber 31 and functioning at certain values or levels to open and close the valve 45. In the instance of the present invention, addition of the lime slurry is regulated to raise the PH level in chamber 31 to a value sufficient to establish the alkalinity of the mixture but below a value at which the trivalent chromium would revert to hexavalent chromium. The control system is in this connection adjustable and is set for example to maintain a PH value in tank 31 on the order of 10.5. Thus, the wastewaters from both tanks 12 and 13 reach mixing chamber 31 in an acid form and are converted within the chamber to an alkaline form, with the hexavalent chromium from tank 12 being further converted to a trivalent form. As the PH value in chamber 31 rises from an acid to an alkaline value contained contaminants become precipitates, the chromium precipitating to chromium hydroxide and the fluorides precipitating to calcium fluoride. For purposes of diagrammatic illustration, probe 46 is shown connected by an electrical conductor 47 to electrically energizable means 48 influencing valve 45. As noted, the sensing and control devices are a part of commercially available systems. Such systems have not been known, however, in systems of the present kind, and particularly one in which fluorides and chromium are brought to a common mixing chamber and simultaneously precipitated as solids. Further, the concept of a controlled PH factor which maintains an alkaline level of the mixture while avoiding a reconversion of trivalent chromium to hexavalent chromium forms no part of the known prior art.

A pump 49 withdraws the mixture of wastewater and precipitated solids from mixing chamber 31 and conducts it by way of a line 51 to a settling basin 52. Basin 52 occupies a relatively elevated position so that flow therefrom may occur under gravity influence. Within the settling basin 52, fluent materials inflowing from chamber 31 form a relatively quiescent pool 53. Calcium fluoride and chromium hydroxide precipitates descend as solids to the lower part of the basin where they collect in a depressed bottom portion 54. At a location elevated relative to the depressed bottom portion 54, the basin 52 provides a port 55 serving as an overflow outlet for relatively clear water from the pool 53. Settled solids in depressed portion 54 of the basin 52 are withdrawn under control of a valve 56 and conducted by way of a line 57 to a sludge receptacle 58. "Clear water" overflowing the basin by way of outlet port 55 is conducted by a line 59 to a further mixing tank 61. Also communicating with the tank 61 are lines 62 and 63 representative of connections extending from other sources of wastewater. These may be floor drains and other sources of relatively lightly contaminated wastewater. Provision is made for conducting a lime slurry to the tank 61, as indicated by a line 64 branching from lime conducting line 43. In the line 43 is a control valve 65 opened and closed by a control system including an electrical lead 66 terminating in a probe 67 immersed in the mixture in tank 61. Provision also is made for supplying acid from a source 67 to the tank 61 through a line 68. A pump 69 may be interposed in the line 68 and suitably operated and controlled to add acid to the tank 61 as may be required. In this connection, it will be understood that the control system of which probe 67 is a part functions generally in the manner of the control system including probe 46 in that the PH factor is regulated to achieve a value allowing solids precipitation while obviating reversion of chromium to a hexavalent form. The tank 61 accordingly is a collection basin in which fluids from different sources are brought and wherein a desired PH factor of the collected fluids is maintained. Mixture means 69 may be provided to keep the solids in tank 61 in suspension.

Chamber 31, receptacle 58 and tank 61 will normally be constructed, as illustrated, as concrete lined pits from which contained materials are pumped to establish a flow as indicated. The basin 52 is a generally elevated member, from which flow may occur by gravity. Pump means may be provided, however, in either or both the lines 57 and 59.

The mixture contained in collection basin or tank 61 is withdrawn by means of a conductor 71 and directed thereby to an exteriorly located recessed clarifier 72. The latter forms a liquid pool 73 supplied from the conductor 71. An upwardly projecting internal shoulder 74 on the clarifier 72 provides a gutter 75 discharging through a line 76 to a place of ultimate disposal, as for example an adjacent flowing stream. The clarifier also includes a skimmer means 78 which, in a manner which it is unnecessary here to consider, revolves within the clarifier at water level. Oil and other lighter than water contaminants are taken up into the means 78 and delivered by a conductor 79 to a receptacle tank 81. Solids from sump 77 are withdrawn by way of a conductor 82 in response to operation of a sludge pump 83. Conductor 82 extends beyond pump 83 and back to settling basin 52 where it discharges along with the discharge from conductor 51 to form the pool 53. There, the solids from the clarifier join other solids in settling to depressed bottom portion 54 and are selectively withdrawn to discharge into receptacle 58. Sludge pump 83 will ordinarily be intermittent in its operation so that solids from the clarifier may be withdrawn as required. The arrangement, it will be evident, is one to simplify the handling of solids and to avoid a use of dewatering and like equipment which would ordinarily be required to separate out the sludge from sump 77. The system substantially reduces turbulence and the need for large scale handling of water volumes.

Overflow of relatively clear water from sludge receptacle 58 to collection basin 61 may be provided for by means of a connection 84.

While a treatment system has been here disclosed in considerable detail it will be understood that apparatus and method steps disclosed may be modified or in some instances omitted without departing from the concepts of the present invention. These include, as before mentioned, the use of a sensor to control the contamination level of chromium in the rinse tanks before treatment. In addition, the simultaneous precipitation of chromium and fluorides is regarded as novel and uniquely effective in wastewater treatments. Dual systems of the prior art are obviated. Still further, the use of a secondary settling basin, represented by basin 52, to receive solids separated out in the clarifier constitutes a second use of the settling basin and provides distinctive advantages as before discussed.

Thus, the invention has been disclosed in connection with certain representative process steps. Modifications have been discussed and these and others obvious to a person skilled in the art to which this invention relates are considered to be within the intent and scope of the invention.

What is claimed is:

1. A wastewater treatment method, including the steps of originating separate streams of a chromium contaminated water and a fluoride contaminated water, the chromium contaminant being in a hexavalent form, subjecting the chromium contaminated water to action converting the hexavalent chromium to trivalent chromium, admitting the acted upon chromium contaminated water and the fluoride contaminated water to a common treatment chamber, adding to the mixture in said common treatment chamber an alkaline material precipitating contained chromium as chromium hydroxide and precipitating contained fluoride as calcium fluoride, controlling addition of the alkaline material to raise the PH level of the mixture to a value sufficient to establish the alkalinity thereof but insufficient to cause the trivalent chromium to revert to hexavalent chromium, conducting the mixture out of said common treatment chamber to a settling basin where solids formed by the precipitating action descend to a lower part thereof, extracting relatively clear liquids from an upper part of said basin and directing them to a clarifier having an outlet for relatively clear liquids to a place of discharge, restricting solids slurry flow from a lower part of said clarifier to a return to said settling basin, the return to said settling basin being direct and in by-passing relation to said common treatment chamber, and withdrawing solids formed sludge from a lower part of said settling basin for disposal.

2. A wastewater treatment method according to claim 1, wherein conversion of the hexavalent chromium to trivalent chromium is conducted to establish the PH level of the chromium contaminated water at a value on the order of 2.5, and where an addition of the alkaline material to the common treatment chamber is limited to prevent the PH level of the mixture in the common treatment chamber from rising appreciably beyond a value of 10.5.

* * * * *